(12) United States Patent
Moran et al.

(10) Patent No.: US 11,720,655 B2
(45) Date of Patent: Aug. 8, 2023

(54) SYSTEM, DEVICE AND METHOD FOR LOGGING-IN BY STARING AT A DISPLAY DEVICE

(71) Applicants: Dov Moran, Kfar-Saba (IL); Menahem Lasser, Kohav-Yair (IL)

(72) Inventors: Dov Moran, Kfar-Saba (IL); Menahem Lasser, Kohav-Yair (IL)

( * ) Notice: Subject to any disclaimer, the term of this patent is extended or adjusted under 35 U.S.C. 154(b) by 450 days.

(21) Appl. No.: 16/105,715

(22) Filed: Aug. 20, 2018

(65) Prior Publication Data

US 2019/0087557 A1    Mar. 21, 2019

Related U.S. Application Data

(60) Provisional application No. 62/559,664, filed on Sep. 18, 2017.

(51) Int. Cl.
| | |
|---|---|
| *G06F 21/32* | (2013.01) |
| *G06F 16/583* | (2019.01) |
| *G06V 40/19* | (2022.01) |
| *G06V 40/16* | (2022.01) |
| *G06V 40/18* | (2022.01) |
| *H04N 23/11* | (2023.01) |
| *H04N 23/611* | (2023.01) |
| *G06K 7/10* | (2006.01) |
| *G06V 20/62* | (2022.01) |
| *G06V 30/10* | (2022.01) |
| *H04N 23/69* | (2023.01) |
| *G06V 30/14* | (2022.01) |

(52) U.S. Cl.
CPC .......... *G06F 21/32* (2013.01); *G06F 16/5838* (2019.01); *G06V 40/172* (2022.01); *G06V 40/19* (2022.01); *G06V 40/197* (2022.01); *H04N 23/11* (2023.01); *H04N 23/611* (2023.01); *G06K 7/10297* (2013.01); *G06V 20/63* (2022.01); *G06V 30/10* (2022.01); *G06V 30/1429* (2022.01); *H04N 23/69* (2023.01)

(58) Field of Classification Search
CPC . G06F 21/32; G06F 16/5838; G06K 9/00288; G06K 9/00604; G06K 9/2018; G06K 9/209; G06K 9/00617; G06K 7/10297; H04N 5/23296; H04N 5/332; H04N 5/23219
USPC .......................................................... 726/18
See application file for complete search history.

(56) References Cited

U.S. PATENT DOCUMENTS

| | | |
|---|---|---|
| 8,625,847 B2 | 1/2014 | Pasquero |
| 8,953,845 B2 | 2/2015 | Pasquero |
| 9,280,652 B1 | 3/2016 | Bozarth |

(Continued)

OTHER PUBLICATIONS

NPL Search Result (Year: 2020).*
NPL Search Terms (Year: 2021).*

*Primary Examiner* — Syed A Zaidi
(74) *Attorney, Agent, or Firm* — Momentum IP; Marc Van Dyke (57) ABSTRACT

Methods, devices and systems for enabling a specific registered user to log into a computerized system having multiple registered users by continuously staring at a display associated with the computerized system for at least a pre-determined threshold duration, without requiring any input other than staring to initiate the login process, and without requiring the user to provide any additional login information or authentication information.

24 Claims, 3 Drawing Sheets

(56) References Cited

U.S. PATENT DOCUMENTS

| | | | |
|---|---|---|---|
| 2002/0095586 A1* | 7/2002 | Doyle | G06F 21/32 713/186 |
| 2003/0115142 A1* | 6/2003 | Brickell | G07C 9/22 705/51 |
| 2004/0215968 A1* | 10/2004 | Rodwell | H04M 1/67 713/186 |
| 2006/0288234 A1* | 12/2006 | Azar | G06F 21/32 713/186 |
| 2007/0106892 A1* | 5/2007 | Engberg | H04L 9/0822 713/168 |
| 2008/0056539 A1* | 3/2008 | Sweeney | G06K 9/00033 382/115 |
| 2008/0092209 A1* | 4/2008 | Davis | G06F 21/316 726/2 |
| 2010/0228585 A1* | 9/2010 | Bradley | G06K 17/00 705/38 |
| 2010/0299530 A1* | 11/2010 | Bell | G06F 21/32 713/186 |
| 2012/0243729 A1* | 9/2012 | Pasquero | G06F 3/013 382/103 |
| 2013/0160141 A1* | 6/2013 | Tseng | G06F 21/31 726/28 |
| 2013/0263227 A1* | 10/2013 | Gongaware | H04L 65/1069 726/4 |
| 2014/0267034 A1 | 9/2014 | Krulce et al. | |
| 2015/0304322 A1* | 10/2015 | Zaidi | G06K 9/00892 382/115 |
| 2016/0307038 A1* | 10/2016 | Skogö | G06V 40/45 |
| 2017/0372055 A1* | 12/2017 | Robinson | H04L 63/0853 |
| 2019/0034606 A1* | 1/2019 | Mapen | G06F 21/40 |

* cited by examiner

FIG. 1B

SYSTEM, DEVICE AND METHOD FOR LOGGING-IN BY STARING AT A DISPLAY DEVICE

RELATED APPLICATION

The present application gains priority from U.S. Provisional Patent Application 62/559,664 filed Sep. 18, 2017, and entitled "Logging-In by Staring at a Screen", which is incorporated herein by reference as if fully set forth herein.

FIELD AND BACKGROUND OF THE INVENTION

The invention, in some embodiments, relates to the field of login processes, and more particularly to methods, devices and systems which enable a user of a computerized system to log into the system by uninterruptedly staring at a display device of the system for at least a pre-defined duration.

In many computerized systems, a user wishing to interact with the computerized system is required to "log into" the system. The process of logging-in typically includes (i) notifying the system that a new user is attempting to log-in, for example by activating a "LOGIN" button in a keypad or on a touch screen, (ii) providing a unique identification of the user, for example in the form of a user name entered via a keyboard, and (iii) providing an authentication of the user, for example in the form of a password entered via a keyboard.

The authentication of a user does not necessitate entering a user name and a password via a keyboard. Other alternatives include authenticating the user by fingerprints, authenticating the user by retina recognition, and authenticating the user by facial recognition. In other words, biometric information of the user can be used to authenticate the user.

In prior art logging-in methods, the user wishing to log-in has to initiate the logging-in process by "telling" the system, or indicating to the system, that he wants to log-in to the system. This requires the use of some form of input device—a keyboard, a mouse, a touch screen, a remote controller, a voice recognition module, a fingerprint scanner, etc.

However, there are cases in which no input device is available for the user to indicate to the system that he wants to log-in. For example, consider a scenario in which a large screen is installed on a high pedestal in order to be viewed from a distance by multiple viewers. The operators would like to give a person standing in the crowd an option of logging-in, which would enable customizing the displayed content according to this person's previously-stored preferences or personal data.

Another example is a system that has to support handicapped users who cannot use hand-operated input devices. In a noisy environment, voice recognition tools would also be unsuitable for logging in due to the disruptions by background noise.

As another example, a passenger sitting in a passenger seat of a vehicle does not have access to the controls of the vehicle computation system, and thus would not be able to indicate a request to log into the vehicle computation system and therefore would not be able to view his personal data on a display of the vehicle.

As yet another example, a car driver is often unable to use input devices because she needs to keep her hands on the steering wheel, but wishes to log into the car computation system for accessing her personal data in order to play her favorite music or access her navigation pre-defined destinations.

In all the exemplary cases provided above, prior art logging-in methods, which require the person logging-in to the system to use an input device, would be unsuitable.

Visual input devices, such as those used for facial recognition or retina recognition methods, are good for user identification and user authentication. However, such devices are unsuitable for initiating the log-in process by notifying the system that a new user is attempting to log-in.

Apple® has recently announced the iPhone X smartphone, which uses advanced facial recognition technology. One feature advertised for the iPhone X is its ability to unlock the phone by its owner looking at the screen.

However, this ability of the iPhone X does not address the above problem. In the iPhone X case, there is only a single registered user to the phone, and the user staring at the screen unlocks the phone after that single registered user had previously logged-in to the phone, prior to locking of the phone. The iPhone X solution does not address the more complex problem of initiating a logging-in process by a user, when the system into which the user wishes to log-in has multiple registered users that are allowed to log-in, and when the user is not previously logged-in.

There is thus a need in the art for a method of initiating a log-in process without use of an input device or biometric recognition device, which method would be suitable even under the more difficult conditions described in the examples above.

SUMMARY OF THE INVENTION

Some embodiments of the invention relate to login processes, and more particularly to methods, devices and system which enable a user of a computerized system to log into the system by uninterruptedly staring at a display device of the system for at least a pre-defined duration.

According to an aspect of some embodiments of the invention, there is provided a method for logging into a computerized system having multiple registered users, the method including:

a. obtaining multiple images from an imaging device associated with the computerized system;
b. detecting a specific person appearing in at least some of the multiple images;
c. detecting that the specific person is attempting to log into the computerized system by detecting that the specific person is staring at a display associated with the computerized system, where the staring at the display is continuously kept by the specific person for at least a pre-defined threshold duration;
d. identifying the specific person to be a specific registered user of the multiple registered users of the computerized system;
e. subsequent to the detecting that the specific person is attempting to log into the computerized system and subsequent to the identifying of the specific person to be the specific registered user of the computerized system, displaying on the display data that is customized to the specific registered user, without receiving from the specific person any request to log into the computerized system other than by the staring at the display, and without the specific person providing any additional login information or authentication information.

In some embodiments, the identifying of the specific person to be the specific registered user includes performing facial recognition of the specific person in the at least some of the multiple images.

In some embodiments, the identifying of the specific person to be the specific registered user includes performing retinal recognition of the specific person in the at least some of the multiple images.

In some embodiments, the identifying of the specific person to be the specific registered user includes performing iris recognition of the specific person in the at least some of the multiple images.

In some embodiments, the identifying of the specific person to be the specific registered user includes identifying an identification tag attached to the specific person.

In some embodiments, the identification tag includes a printed identification tag, and the identifying of the specific person to be the specific registered user includes detecting text or an image included in the printed identification tag.

In some embodiments, the identification tag includes an RFID tag, and the identifying of the specific person to be the specific registered user includes reading the RFID tag.

In some embodiments, the identification tag includes an implanted identification tag, and the identifying of the specific person to be the specific registered user includes reading the implanted identification tag.

In some embodiments, the identifying of the specific person to be the specific registered user includes identifying an electronic device of the specific person.

In some embodiments, the electronic device is a phone. In some embodiments, the electronic device is a watch.

In some embodiments, the identifying the electronic device includes receiving an identification message from the electronic device. In some embodiments, the identifying the electronic device includes identifying an RFID tag associated with the electronic device. In some embodiments, the identifying the electronic device includes communicating with the electronic device via a communication channel. In some embodiments, the communication channel is selected from the group consisting of a cellular communication channel, a WiFi communication channel, and a Bluetooth communication channel.

In some embodiments, the identifying of the specific person to be the specific registered user includes identifying a geographic location of an electronic device of the specific person.

In some embodiments, the identifying of the specific person to be the specific registered user includes zooming the imaging device on the face of the specific person.

In some embodiments, the identifying of the specific person to be the specific registered user includes obtaining one or more images from a second imaging device associated with the computerized system, the second imaging device differing from the imaging device in at least one characteristic selected from the group consisting of resolution and field of view.

In some embodiments, the multiple images are multiple still images. In some embodiments, the multiple images are multiple frames of video.

In some embodiments, the imaging device is a visible range camera. In some embodiments, the imaging device is an infrared camera.

According to an aspect of some embodiments of the invention, there is provided a device for logging into a computerized system having multiple registered users, the device being functionally associated with the computerized system, with a display, and with an imaging device, the device including:

a. a processor; and
    b. a non-transitory computer readable storage medium for instructions execution by the processor, the non-transitory computer readable storage medium having stored:
        i. instructions, that when executed by the processor, receive multiple images of a vicinity of the display from the imaging device;
        ii. instructions, that when executed by the processor, detect a specific person appearing in at least some of the multiple images;
        iii. instructions, that when executed by the processor, detect that the specific person is attempting to log into the computerized system by detecting that the specific person is staring at the display, where the staring at the display is continuously kept by the specific person for at least a pre-defined threshold duration;
        iv. instructions, that when executed by the processor, identify the specific person to be a specific registered user of the multiple registered users of the computerized system;
        v. instructions, that when executed by the processor, display on the display data that is customized to the specific registered user, without receiving from the specific person any request to log into the computerized system other than by the staring at the display, and without the specific person providing any additional login information or authentication information, the instructions that when executed by the processor display data that is customized to be executed subsequent to execution of the instructions that when executed by the processor detect that the specific person is attempting to log into the computerized system and subsequent to execution of the instructions that when executed by the processor identify the specific person to be the specific registered user of the computerized system.

In some embodiments, the instructions that when executed by the processor identify the specific person to be the specific registered user include instructions, that when executed by the processor, perform facial recognition of the specific person in the at least some of the multiple images.

In some embodiments, the instructions that when executed by the processor identify the specific person to be the specific registered user include instructions, that when executed by the processor, perform retinal recognition of the specific person in the at least some of the multiple images.

In some embodiments, the instructions that when executed by the processor identify the specific person to be the specific registered user include instructions, that when executed by the processor, perform iris recognition of the specific person in the at least some of the multiple images.

In some embodiments, the instructions that when executed by the processor identify the specific person to be the specific registered user include instructions, that when executed by the processor, identify an identification tag attached to the specific person.

In some embodiments, the identification tag includes a printed identification tag, and the instructions that when executed by the processor identify the specific person to be the specific registered user include instructions, that when executed by the processor, detect text or an image included in the printed identification tag.

In some embodiments, the identification tag includes an RFID tag, and the instructions that when executed by the processor identify the specific person to be the specific registered user include instructions, that when executed by the processor, read the RFID tag.

In some embodiments, the identification tag includes an implanted identification tag, and the instructions that when executed by the processor identify the specific person to be the specific registered user include instructions, that when executed by the processor, read the implanted identification tag.

In some embodiments, the instructions that when executed by the processor identify the specific person to be the specific registered user include instructions, that when executed by the processor, identify an electronic device of the specific person.

In some embodiments, the electronic device is a phone. In some embodiments, the electronic device is a watch.

In some embodiments, the instructions that when executed by the processor identify the electronic device include instructions, that when executed by the processor, receive an identification message from the electronic device.

In some embodiments, the instructions that when executed by the processor identify the electronic device include instructions, that when executed by the processor, identify an RFID tag associated with the electronic device.

In some embodiments, the instructions that when executed by the processor identify the electronic device include instructions, that when executed by the processor, communicate with the electronic device via a communication channel. In some embodiments, the communication channel is selected from the group consisting of a cellular communication channel, a WiFi communication channel, and a Bluetooth communication channel.

In some embodiments, the instructions that when executed by the processor identify the specific person to be the specific registered user include instructions, that when executed by the processor, identify a geographic location of an electronic device of the specific person.

In some embodiments, the instructions that when executed by the processor identify the specific person to be the specific registered user include instructions, that when executed by the processor, zoom the imaging device on the face of the specific person.

In some embodiments, the device is functionally associated also with a second imaging device, the second imaging device differing from the imaging device in at least one characteristic selected from the group consisting of resolution and field of view, and wherein the instructions that when executed by the processor identify the specific person to be the specific registered user include instructions, that when executed by the processor, receive one or more images from the second imaging device.

In some embodiments, the multiple images are multiple still images. In some embodiments, the multiple images are multiple frames of video.

In some embodiments, the multiple images are images taken in a visible light range. In some embodiments, the multiple images are images taken in an infrared light range.

According to an aspect of some embodiments of the invention, there is provided a computerized system enabling logging in for viewing customized data, the computerized system having multiple registered users, the computerized system including:
  a. a display;
  b. an imaging device, adapted to capture multiple images of a vicinity of the display; and
  c. a controller including:
    i) a processor; and
    ii) a non-transitory computer readable storage medium for instructions execution by the processor, the non-transitory computer readable storage medium having stored:
      A) instructions, that when executed by the processor, receive multiple images from the imaging device;
      B) instructions, that when executed by the processor, detect a specific person appearing in at least some of the multiple images;
      C) instructions, that when executed by the processor, detect that the specific person is attempting to log into the computerized system by detecting that the specific person is staring at the display, where the staring at the display is continuously kept by the specific person for at least a pre-defined threshold duration;
      D) instructions, that when executed by the processor, identify the specific person to be a specific registered user of the multiple registered users of the computerized system;
      E) instructions, that when executed by the processor, display on the display data that is customized to the specific registered user, without receiving from the specific person any request to log into the computerized system other than by the staring at the display, and without the specific person providing any additional login information or authentication information, the instructions that when executed by the processor display data that is customized to be executed subsequent to execution of the instructions that when executed by the processor detect that the specific person is attempting to log into the computerized system and subsequent to execution of the instructions that when executed by the processor identify the specific person to be the specific registered user of the computerized system.

In some embodiments, the instructions that when executed by the processor identify the specific person to be the specific registered user include instructions, that when executed by the processor, perform facial recognition of the specific person in the at least some of the multiple images.

In some embodiments, the instructions that when executed by the processor identify the specific person to be the specific registered user include instructions, that when executed by the processor, perform retinal recognition of the specific person in the at least some of the multiple images.

In some embodiments, the instructions that when executed by the processor identify the specific person to be the specific registered user include instructions, that when executed by the processor, perform iris recognition of the specific person in the at least some of the multiple images.

In some embodiments, the instructions that when executed by the processor identify the specific person to be the specific registered user include instructions, that when executed by the processor, identify an identification tag attached to the specific person.

In some embodiments, the identification tag includes a printed identification tag, and the instructions that when executed by the processor identify the specific person to be the specific registered user include instructions, that when executed by the processor, detect text or an image included in the printed identification tag.

In some embodiments, the identification tag includes an RFID tag, and the instructions that when executed by the processor identify the specific person to be the specific registered user include instructions, that when executed by the processor, read the RFID tag.

In some embodiments, the identification tag includes an implanted identification tag, and the instructions that when executed by the processor identify the specific person to be the specific registered user include instructions, that when executed by the processor, read the implanted identification tag.

In some embodiments, the instructions that when executed by the processor identify the specific person to be the specific registered user include instructions, that when executed by the processor, identify an electronic device of the specific person.

In some embodiments, the electronic device is a phone. In some embodiments, the electronic device is a watch.

In some embodiments, the instructions that when executed by the processor identify the electronic device include instructions, that when executed by the processor, receive an identification message from the electronic device.

In some embodiments, the instructions that when executed by the processor identify the electronic device include instructions, that when executed by the processor, identify an RFID tag associated with the electronic device.

In some embodiments, the instructions that when executed by the processor identify the electronic device include instructions, that when executed by the processor, communicate with the electronic device via a communication channel. In some embodiments, the communication channel is selected from the group consisting of a cellular communication channel, a WiFi communication channel, and a Bluetooth communication channel.

In some embodiments, the instructions that when executed by the processor identify the specific person to be the specific registered user include instructions, that when executed by the processor, identify a geographic location of an electronic device of the specific person.

In some embodiments, the instructions that when executed by the processor identify the specific person to be the specific registered user include instructions, that when executed by the processor, zoom the imaging device on the face of the specific person.

In some embodiments, the computerized system further includes a second imaging device, the second imaging device differing from the imaging device in at least one characteristic selected from the group consisting of resolution and field of view, and wherein the instructions that when executed by the processor identify the specific person to be the specific registered user include instructions, that when executed by the processor, receive one or more images from the second imaging device.

In some embodiments, the multiple images are multiple still images. In some embodiments, the multiple images are multiple frames of video.

In some embodiments, the imaging device is a visible range camera. In some embodiments, the imaging device is an infrared camera.

Unless otherwise defined, all technical and scientific terms used herein have the same meaning as commonly understood by one of ordinary skill in the art to which the invention pertains. In case of conflict, the specification, including definitions, will take precedence.

As used herein, the terms "comprising", "including", "having" and grammatical variants thereof are to be taken as specifying the stated features, integers, steps or components but do not preclude the addition of one or more additional features, integers, steps, components or groups thereof. These terms encompass the terms "consisting of" and "consisting essentially of".

BRIEF DESCRIPTION OF THE FIGURES

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like elements.

In the drawings.

DESCRIPTION OF SOME EMBODIMENTS OF THE INVENTION

It is a goal of the present invention to enable a user to initiate a log-in process by continuously staring at a display device, or screen, of the system into which the user is logging in for a pre-defined time interval.

A wide-angle camera is installed on or near the screen, and captures images of the user(s) located in front of the screen. The captured images are provided to a processor for processing. The camera may capture and provide periodic still images or continuous video. A face identification module running on the processor analyzes the captured images, either still images or frames of the captured video, and locates human faces in the images. A gaze-identification system running on the processor determines the direction in which each of the faces is looking, distinguishing between faces that are staring at the screen and faces that are staring, or looking, in other directions.

A time threshold is pre-defined (e.g. 10 seconds or 5 seconds), so that only if it is detected that a person is consistently staring at the screen for a period of time that is equal to or longer than the pre-defined time threshold, that person is considered to be attempting to log-in. The person must stare at the screen continuously. As such, if a person looks at the screen for a period of time less than the threshold, then looks in a different direction, and returns to looking at the screen, the time measurement will be reset to zero when he looks to the different direction, and measurement will restart from zero when he returns to looking at the screen. Optionally, briefly removing the eyes from the screen for a short time that does not exceed a short, pre-defined threshold duration, (e.g. 0.5 seconds or 0.3 seconds), is not considered a disturbance of the continuous staring.

At the time that the system recognizes that a user is attempting to log-in, it has already acquired an image of the user's face. A face-recognition module, running on the processor, can use the image of the user's face for identification as well as authentication of the user. A database of faces of registered users having valid accounts in the system is searched to find the face in the captured image. Once the face in the captured image is located in the database, the system knows the account into which the person currently staring at the screen is attempting to log-in, and confirms that the person staring at the screen is indeed the owner of the account.

Other visual-based recognition methods may be used to identify the user staring at the screen, instead of using facial recognition. For example, iris recognition or retina recognition modules, running on the processor, can be used for performing the functions carried out by the facial recognition module in the example above.

In some embodiments, while a user is logged-in to the system, no new login attempts by other users are detected. In other embodiments, while a user is logged-in to the system, new login attempts are detected, but are not accepted. Termination of a login session of the user currently logged-in to the system may be triggered by (i) passing of a pre-defined duration since initiating the login session, and/or (ii) receiving an explicit instruction by the currently logged-in user to terminate the session. Such an explicit instruction may be provided, for example, by the currently logged-in user staring away from the screen for a pre-defined time interval.

Techniques for identifying the direction of the gaze of a user in front of a screen equipped with a camera are well known in the art. For example, U.S. Pat. Nos. 8,625,847 and 8,953,845, which are hereby incorporated herein by reference in their entirety, disclose methods for providing a password during a log-in process, by defining the password to be an ordered sequence of objects, displaying a matrix containing the objects on the screen, and detecting whether the user's gaze is moving between the displayed objects in the correct order. Note however, that these patents are fundamentally different from the present invention, as the present invention uses gaze detection for indicating that a log-in process is being initiated, while in the patents mentioned above following of a user's gaze is used after the login process has already been initiated using methods known in the prior art, for providing a password for authentication.

Optionally, the system that is being logged into may use additional modules and/or techniques for identifying and authenticating the user that is logging-in by staring at the screen, in additional to the visual techniques described above, namely face detection, retina detection, and iris detection, and the like.

For example, each user may have an identification tag (e.g. an RFID tag) that uniquely identify him A sensor attached to the system being logged into detects and identifies the tag of a person found to be staring at the screen for a long enough duration. By identifying that the person staring at the screen has a qualifying identification tag, the system may conclude that the person is indeed trying to log-in and is not a by-stander that happens to be looking in the direction of the screen for other reasons.

An identification tag may be implanted within the body of a user, or may be carried by the user on his/her body (e.g. on a chain), or in a pocket or a bag.

In another example, the system takes advantage of electronic devices carried by its users. Many electronic devices, such as smartphones or smart watches, are personal devices belonging to their owners, and can be used for identifying or locating their owner. Additionally, such devices may be connected to the Internet (or another network), may know their geographical location, and may have short-range communication mechanisms (Bluetooth, WiFi, and the like), as is the case with most smartphones.

In one embodiment of using electronic devices belonging to users to support the log-in process, the system being logged into attempts to initiate network communication (e.g. via the Internet) with the corresponding electronic device of any candidate registered user of the system which may be the person currently staring at the screen. If the network communication is successful, an application in the electronic device responds by providing its geographic location to the system. The system then compares the geographic location received from the device with the known geographic location of the logging-in screen, and can conclude whether the candidate registered user is currently in the vicinity of the logging-in screen. When the candidate registered user is in the vicinity of the logging-in screen, the probability that the person staring at the screen is that candidate registered user increases. When the candidate registered user is not in the vicinity of the logging-in screen, the probability that the person staring at the screen is that candidate registered user decreases. Clearly, comparison of the location of the electronic device with that of the logging-in screen is not a fool-proof indicator of the identity of the user currently staring at the screen, for example when a registered user forgets his phone at home or lends it to a friend, but it still significantly increases the likelihood of a correct identification.

In another embodiment of using electronic devices belonging to users to support the log-in process, the system being logged into attempts to initiate short-range communication with the corresponding electronic device of any candidate registered user of the system which may be the person currently staring at the screen. If the short range communication is successful, an application in the device responds by acknowledging receipt of the communication message. If the system receives an acknowledgement from an electronic device, it may conclude that the candidate registered user associated with that electronic device is currently in the vicinity of the logging-in screen, which conclusion increases the probability of that candidate registered user being the person currently staring at the screen. If the system does not receive an acknowledgement from a given electronic device, it may decrease the probability of the candidate registered user associated with the given electronic device being the person currently staring at the screen. Clearly, this technique is also not fool-proof, because establishing communication with a device of a registered user may fail even though he is in the vicinity of the logged-in screen, and the registered user may forget or loan his/her device.

Definitions

This disclosure, including the description of the invention and the claims, should be interpreted according to the definitions below.

In case of a contradiction between the definitions provided herein and other sections of this disclosure, these definitions should prevail.

In case of a contradiction between the definitions provided herein and a definition or a description in any other document, including in another document included in this disclosure by reference, these definitions should prevail, even if the definition or the description in the other document is commonly accepted by a person of ordinary skill in the art.

The terms "logging into a computerized system" and "signing into a computerized system" are used interchangeably, and relate to a process by which an individual gains access to the computerized system after being identified by the computerized system as a valid user.

The term "continuously staring at an object" relates to a person looking at the object without removing his/her eyes from the object for the entire time interval of staring. Optionally, briefly removing the eyes from the object for a short time that does not exceed a small pre-defined threshold value is not considered a disturbance of the continuous staring.

The term "registered user of a computerized system" relates to a user of the computerized system who has previously registered with the computerized system, where the computerized system has access to some data that is specific to the user. The specific data may be a user name, a password, a visual image, a preference, a file or any other type of data.

The term "facial recognition" relates to a process of identifying or verifying the identity of a person from one or more digital images or from one or more video frames by comparing selected facial features of the person obtained from the image(s) or frame(s) to features of faces included in a face database.

The terms "retinal recognition" and "retina recognition" are used interchangeably, and relate to a process of identifying or verifying the identity of a person from one or more digital images or from one or more video frames by comparing selected patterns of the person's retina blood vessels obtained from the image(s) or frame(s) to patterns of people's retina blood vessels included in a retina database.

The term "iris recognition" relates to a process of identifying or verifying the identity of a person from one or more digital images or from one or more video frames by comparing selected patterns in the person's iris or irises obtained from the image(s) or frame(s) to patterns of people's iris or irises included in an iris database.

The term "microchip" is a synonym to the term "integrated circuit". The term "identification tag" relates to a tag which uniquely identifies a person. An identification tag may be a paper or plastic identification tag having printed thereon information which uniquely identifies the person, or may be an electronic identification tag including a microchip which uniquely identifies the person. An electronic identification tag may employ RFID technology or any other technology.

The term "an identification tag attached to a person" relates to an identification tag that is either implanted within the body of the person it identifies or is carried by or worn by the person it identifies.

The principles, uses and implementations of the teachings herein may be better understood with reference to the accompanying description and figures. Upon perusal of the description and figures present herein, one skilled in the art is able to implement the invention without undue effort or experimentation.

Before explaining at least one embodiment of the invention in detail, it is to be understood that the invention is not limited in its applications to the details of construction and the arrangement of the components and/or methods set forth in the following description and/or illustrated in the drawings and/or the examples. The invention can be implemented with other embodiments and can be practiced or carried out in various ways. It is also understood that the phraseology and terminology employed herein is for descriptive purpose and should not be regarded as limiting.

Figure 1A:
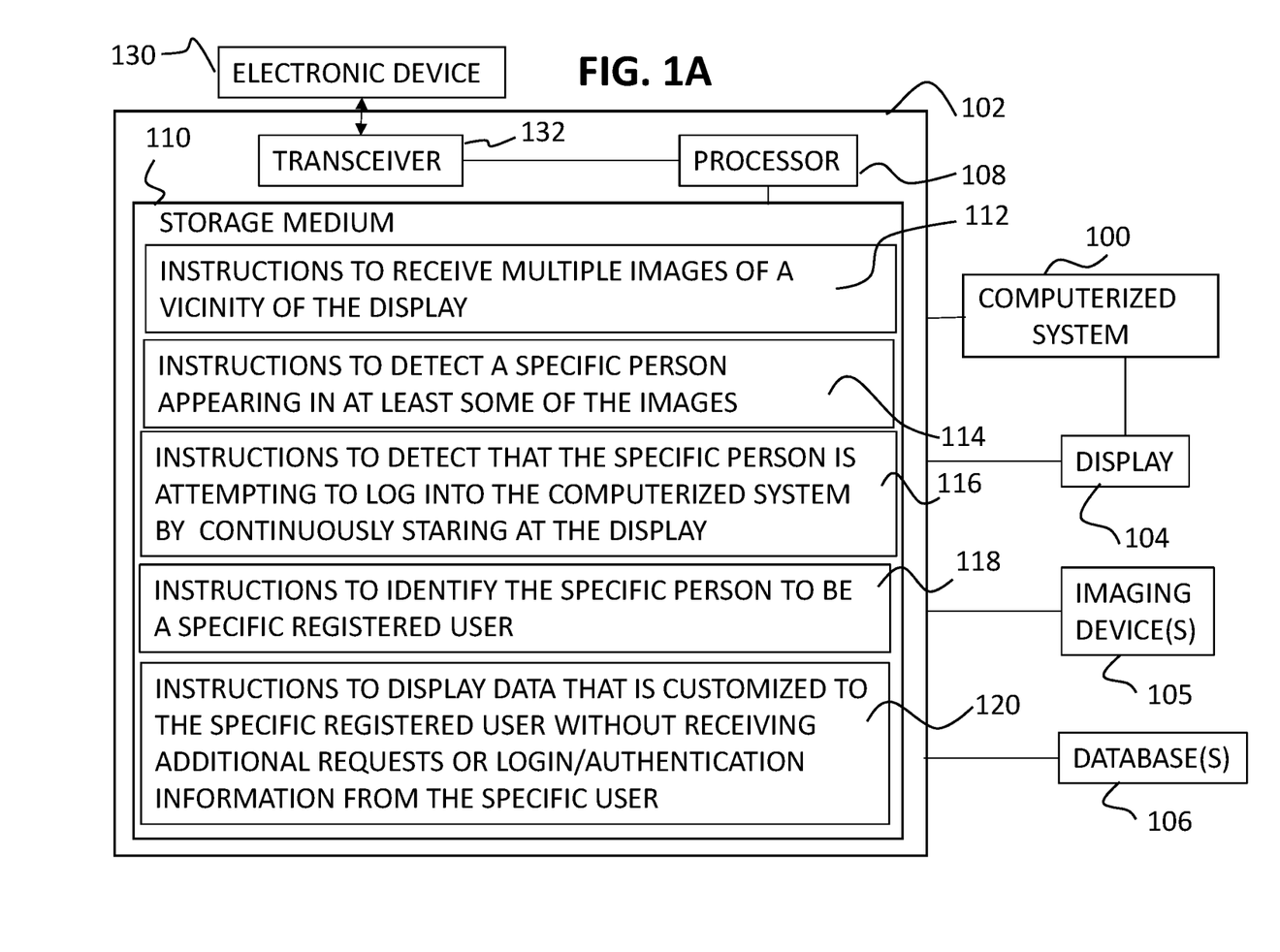
FIGS. 1A and 1B are schematic block diagrams of two embodiment of a system for logging in by staring at a display according to embodiments of the teachings herein.
Figure 1B:
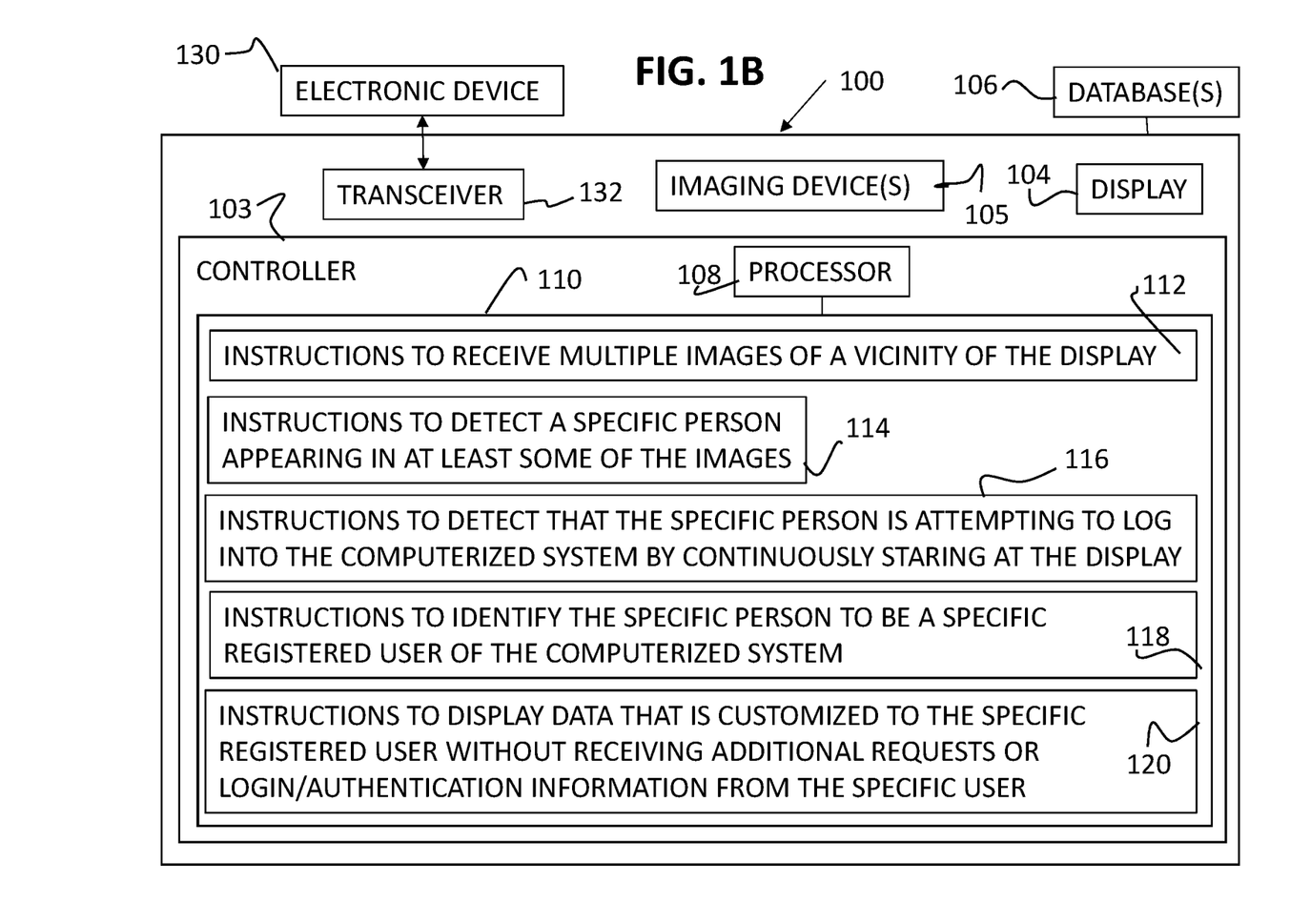

Reference is now made to FIGS. 1A and 1B, which are schematic block diagrams of two embodiments of a system for logging in by staring at a display according to embodiments of the teachings herein.

As seen in FIG. 1A, a computerized system 100 enabling logging in for viewing customized data by staring at a display is associated with a device 102 for logging into the computerized system and with a display 104. Device 102 is further functionally associated with one or more imaging devices 105.

In the embodiment illustrated in FIG. 1B, the computerized system 100 includes a controller 103, similar to device 102 of FIG. 1A, as well as the display 104 and the one or more imaging devices 105.

In some embodiments, device 102 or controller 103 may be functionally associated with one or more databases 106, for example a face database suitable for carrying out facial recognition, an iris database suitable for carrying out iris recognition, and/or a retinal database suitable for carrying out retina recognition, as explained in further detail hereinbelow.

In some embodiments, one or more imaging devices 105 may include a stills imaging device and/or a video imaging device. In some embodiments, one or more imaging devices 105 may include a visible range camera capturing images in the visible light range, and/or an infrared camera capturing images in the infrared light range.

In some embodiments, one or more imaging devices 105 include at least two imaging devices, which differ from each other in at least one characteristic selected from the group consisting of resolution and field of view.

Device 102 and controller 103 include a processor 108 and a storage medium 110, which is typically a non-transitory computer readable storage medium.

The storage medium 110 includes instructions to be executed by the processor 108, in order to carry out various steps of the method described herein below with respect to FIG. 2. Specifically, the storage medium includes at least the following instructions:

instructions 112, that when executed by processor 108, receive multiple images from one or more imaging devices 105, the images being of a vicinity of display 104;

instructions 114, that when executed by processor 108, detect a specific person appearing in at least some of the multiple received images;

instructions 116, that when executed by processor 108, detect that the specific person detected during execution of instructions 114 is attempting to log into the computerized system 100, by detecting that the specific person is staring at display 104;

instructions 118, that when executed by processor 108, identify the specific person to be a specific registered user, which is one of the multiple registered users of computerized system 100; and instructions 120, to be executed following execution of instructions 116 and 118, that when executed by processor 108, display on display 104 data that is customized to the specific registered user.

In order for processor 108 to successfully detect an attempt to log into computerized system 100 by instructions 116, the specific person must be staring at display 104 continuously for at least a pre-defined threshold duration, for example 10 seconds, 15 seconds, or 1 minute.

It is a particular feature of the present invention that instructions 120 display data that is customized to the specific registered user, without receiving from the specific user any request to log into computerized system 100 other than by staring at display 104. Additionally, the specific person does not need to provide any additional login information or authentication information in order for instructions 120 to display customized data.

In some embodiments, the instructions 118 include instructions to perform facial recognition of the specific person in at least some of the received images, in order to detect whether or not the specific person is the specific registered user. Facial recognition may be carried out using a face database, for example one of one or more databases 106.

In some embodiments, the instructions 118 include instructions to perform retinal recognition of the specific person in at least some of the received images, in order to detect whether or not the specific person is the specific registered user. Retinal recognition may be carried out using a retinal database, for example one of one or more databases 106.

In some embodiments, the instructions 118 include instructions to perform iris recognition of the specific person in at least some of the received images, in order to detect whether or not the specific person is the specific registered user. Iris recognition may be carried out using an iris database, for example one of one or more databases 106.

In some embodiments, the instructions 118 include instructions to identify an identification tag attached to the person, so as to identify the specific person, or to improve the confidence that a previous identification is correct.

In some cases, the identification tag may be a printed identification tag, which is identified by detecting text or an image included in the printed identification tag. For example, facial recognition may be used to identify the face of the owner of the tag in an image on the printed tag, or OCR techniques may be used to identify the name or other identifier of the user written on the printed tag.

In some cases, the identification tag may be an RFID tag, which is identified by reading the RFID tag using a suitable RFID tag reader.

In some cases, the identification tag may be an implanted identification tag, implanted in the body of the specific person. The implanted tag may be identified by reading the tag using a suitable tag reader.

In some embodiments, the instructions 118 include instructions to identify an electronic device of the specific person, illustrated in FIGS. 1A and 1B as electronic device 130. Identification of electronic device 130 enables identification of the specific person, or improves the confidence that a previous identification is correct. Electronic device 130 may be a mobile phone, such as a smart phone, may be a watch, such as a smart watch, or may be any other suitable and personal electronic device.

In some embodiments, the electronic device 130 is identified by processor 108 receiving an identification message from electronic device 130. In some such embodiments, processor 108 may be functionally associated with a transceiver 132, which may receive the identification message. The identification message may provide an identifier of the electronic device such as an associated phone number, an associated owner name and/or any other identifier of the electronic device.

In some embodiments, the electronic device 130 is identified by identification of an RFID tag associated with electronic device 130, for example using a suitable RFID tag reader.

In some embodiments, the electronic device 130 is identified by processor 108 communicating with electronic device 130 via a communication channel, for example via transceiver 132 functionally associated with processor 108. The communication channel may be selected from the group consisting of a cellular communication channel, a WiFi communication channel, and a Bluetooth communication channel.

In some embodiments, instructions 118 identify the specific person, or improve the confidence that a previous identification is correct, by identifying a geographic location of electronic device 130 of the specific person. Identification of the geographic location of electronic device 130 may be achieved by transceiver 132 receiving from electronic device 130 a geographic location message, indicating the geographic location of the electronic device as sensed by a location sensor such as GPS or as sensed by positioning between cellular towers.

In some embodiments, instructions 118 include instructions to zoom at least one of the one or more imaging devices 105 on the face of the specific person, for example in order to get higher resolution images of the specific person's face, irises, or retina, for facial recognition, iris recognition, or retinal recognition, as described hereinabove.

In some embodiments in which first and second imaging devices 105 are used, which differ from each other in at least one of resolution and field of view, instructions 112 include instructions to receive multiple images from the first imaging device, and instructions 118 include instructions to receive one or more images from the second imaging device.

Figure 2:
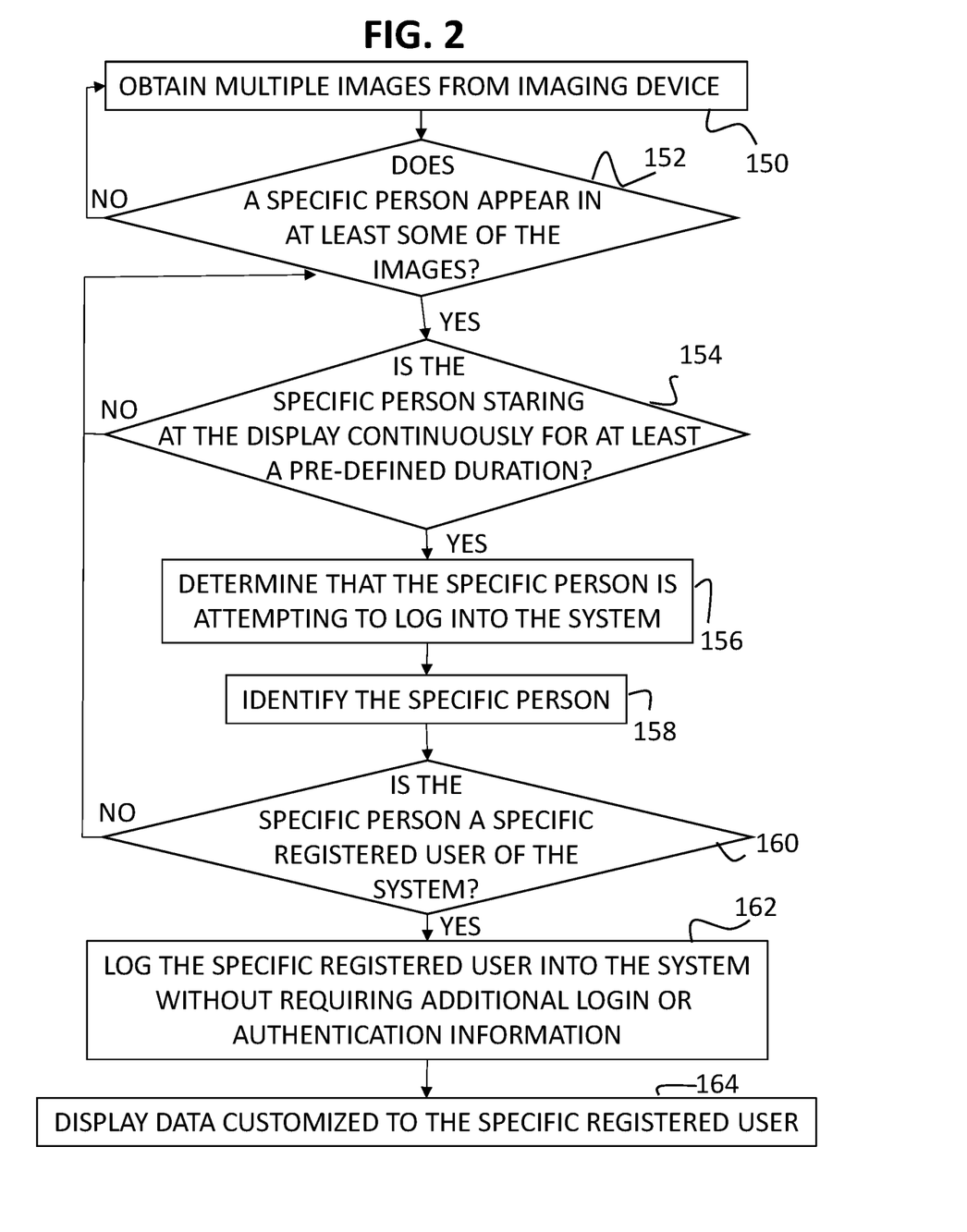
FIG. 2 is a flow chart of an embodiment of a method for logging into a computerized system by staring at a display according to embodiments of the teachings herein.

A method of using the systems of FIGS. 1A and 1B is now described with respect to FIG. 2.

As seen, at step 150, processor 108 of device 102 or controller 103 executes instructions 112, and obtains multiple images of the vicinity of display 104 from the one or more imaging devices 105.

In some embodiments, the images are all received from a single imaging device 105. In other embodiments, the images are received from at least two imaging devices, which differ from one another in resolution and/or in field of view.

In some embodiments, the obtained images are multiple still images. In some embodiments, the obtained images are multiple frames of video. In some embodiments, at least one imaging device is a visible range camera, such that at least some of the images are in the visible range of light. In some embodiments, at least one imaging device is an infrared camera, such that at least some of the images are in the infrared range.

At step 152, processor 108 executes instructions 114 and detects whether or not a specific person appears in at least some of the multiple images. If the answer is negative, and there is no specific person that appears in at least some of the images, the flow returns to step 150 and additional images are obtained.

Otherwise, if a specific person is identified in at least some of the multiple images, at step 154 processor 108 executes instructions 116 and detects whether or not the specific person is staring at display 104 continuously for at least a pre-defined threshold duration. Whether or not the specific person is staring at the display continuously may be detected by gaze detection analysis carried out in the images in which the specific person appears, using methods known in the art as mentioned hereinabove.

If the specific person is not staring at the display continuously for at least the pre-determined threshold duration, the flow returns to step 152 to detect whether there is another specific person appearing in at least some of the images. If there is another specific person appearing in at least some of the images, the flow will continue from step 152 to step 154, as described herein. Otherwise, if there is no other specific person appearing in at least some of the images, the flow will proceed from step 152 to step 150 to obtain additional images, as specified hereinabove.

However, if the specific person is detected to be staring at the display continuously for a pre-defined duration, at step 156 processor 108 determines that the specific person is attempting to log into the computerized system 100.

Subsequently, processor 108 executes instructions 118 and identifies the specific person at step 158, and determines whether or not the specific person is a specific registered user of computerized system 100 at step 160.

In some embodiments, steps 158 and 160 may be two separate steps, as illustrated in FIG. 2. In such embodiments, the specific person may be identified at step 158 using a suitable identifier or identification method, such as a phone belonging to the user or a tag implanted in the body of the user as explained in further detail hereinabove, and once the user has been identified, it is determined whether or not the person is a registered user at step 160.

In other embodiments, steps 158 and 160 may be combined into a single step. In such embodiments, facial recognition or other recognition techniques are used to identify whether or not the specific user appearing in the images and staring at the screen is a registered user of computerized system 100, for example by comparing an image of the user to a database including images of registered users of the system, and as a by-product of that, the specific person is also identified.

In some embodiments, identification of the specific person at step 158 (or at a combined step of steps 158 and 160) may include performing facial recognition, retinal recognition, and/or iris recognition of the specific person in the images in which the specific person appears. Facial recognition, retinal recognition, and iris recognition may be performed using techniques known in the art.

In some embodiments, identification of the specific person at step 158 (or at a combined step of steps 158 and 160) may include identifying an identification tag attached to, or associated with, the specific person. In some cases, identification of the identification tag may uniquely and absolutely identify the specific person appearing in the images, whereas in other cases identification of the identification tag may serve only to increase (or decrease) the probability that identification of the specific person, using other methods such as facial recognition, is correct.

In some embodiments, the tag is a printed identification tag, and is used to identify the specific person by detection of text and/or an image included in the printed identification tag. For example, the tag may be a magnetic card which an employee swipes when entering the workplace, and which includes an image of the face of the employee and/or text including the name of the employee. The text and image may be analyzed, for example using OCR and/or facial recognition algorithms, to identify the owner of the tag.

In some embodiments, the tag is an electronic identification tag. For example, the electronic identification tag may be an RFID tag, which may be identified by reading the tag using a suitable RFID tag reader. As another example, the electronic identification tag may be an implanted identification tag, such as a microchip including identification information that is implanted in the body of the tag owner. An implanted tag may be read using a suitable tag reader.

In some embodiments, identification of the specific person at step 158 (or at a combined step of steps 158 and 160) may include identifying an electronic device, such as electronic device 130 described hereinabove, of the specific person. In some cases, identification of the electronic device may uniquely and absolutely identify the specific person appearing in the images, whereas in other cases identification of the electronic device may serve only to increase (or decrease) the probability that identification of the specific person, using other methods such as facial recognition, is correct.

As mentioned above, in some embodiments, the electronic device may be a phone. In some embodiments, the electronic device may be a watch.

In some embodiments, the electronic device may be identified by processor 108 receiving an identification message from the electronic device, such as a message including a phone number associated with the device, or another unique identifier of the device.

In some embodiments, the electronic device may include, or be associated with, an RFID tag, which may be used for identification of the electronic device, for example using a suitable reader.

In some embodiments, the electronic device may be identified by processor 108 communicating with the electronic device via a communication channel. The communication channel may be a cellular communication channel, a WiFi communication channel, and/or a Bluetooth communication channel. In some embodiments, such communication may also be indicative of a distance of the electronic device from processor 108, particularly when using short-range communication channels such as WiFi and Bluetooth.

In some embodiments, identification of the specific person at step 158 (or at a combined step of steps 158 and 160) may include identifying the geographic location of the electronic device of the specific person. In some cases, identification of the location of the electronic device may serve only to increase (or decrease) the probability that identification of the specific person, using other methods such as facial recognition, is correct. For example, if it is determined that the electronic device is indeed in the vicinity of display 104, this would increase the probability that identification of the specific person is correct.

In some embodiments, identification of the specific person at step 158 (or at a combined step of steps 158 and 160) may include zooming at least one of imaging devices 105 on the face of the specific person. For example, this may assist in obtaining a better image of the face of the specific person, for higher confidence in facial recognition of the person.

If, at step 160 (or at a combined step of steps 158 and 160), it is determined that the specific person is not a specific registered user of computerized system 100, the flow returns to step 152. If there is another specific person appearing in at least some of the images, the flow will continue from step 152 to step 154, as described hereinabove. Otherwise, if there is no other specific person appearing in at least some of the images, the flow will proceed from step 152 to step 150 to obtain additional images, as specified hereinabove.

However, if at step 160 it is determined that the specific person identified in step 158 is indeed a registered user of computerized system 100, processor 108 carries out instructions 120 by logging the specific registered user into the computerized system 100 at step 162, and displaying data customized to the specific registered user at step 164.

Logging in of the specific registered user at step 162 occurs without receiving from the specific person any request to log into computerized system 100 other than by staring at the display, and without the specific person providing any additional login information or authentication information.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A method for logging into a computerized system having multiple registered users, the method comprising:
   A) obtaining multiple images from an imaging device associated with the computerized system;
   B) detecting a specific person appearing in at least some of said multiple images;
   C) detecting, in said at least some of said multiple images, a direction of gaze in which said specific person is looking;
   D) based only on (i) said detected direction of gaze being toward a display associated with the computerized system, and (ii) said detected direction of gaze being continuously kept by said specific person toward any location on said display for at least a pre-defined threshold duration, identifying that said specific person is attempting to log into the computerized system by staring at said display;
   E) identifying said specific person to be a specific registered user of the multiple registered users of the computerized system;
   F) subsequent to said detecting identifying that said specific person is attempting to log into the computerized system and subsequent to said identifying of said specific person to be said specific registered user of the computerized system, displaying on said display data that is customized to said specific registered user,
      wherein, said identifying that said specific person is attempting to log into the computerized system and said displaying on said display data that is customized to said specific registered user are both carried out without receiving from said specific person any request to log into the computerized system other than by said staring at any location on said display, and without said specific person providing any additional login information or authentication information.

2. The method of claim 1, wherein said identifying of said specific person to be said specific registered user includes identifying an identification tag attached to said specific person.

3. The method of claim 2, wherein said identification tag comprises a printed identification tag, and said identifying of said specific person to be said specific registered user comprises detecting text or an image included in said printed identification tag.

4. The method of claim 2, wherein said identification tag comprises an RFID tag, and said identifying of said specific person to be said specific registered user comprises reading said RFID tag.

5. The method of claim 2, wherein said identification tag comprises an implanted identification tag, and said identifying of said specific person to be said specific registered user comprises reading said implanted identification tag.

6. The method of claim 1, wherein said identifying of said specific person to be said specific registered user includes identifying an electronic device of said specific person.

7. The method of claim 6, wherein said identifying said electronic device comprises receiving an identification message from said electronic device.

8. The method of claim 6, wherein said identifying said electronic device comprises identifying an RFID tag associated with said electronic device.

9. The method of claim 6, wherein said identifying said electronic device comprises communicating with said electronic device via a communication channel.

10. The method of claim 1, wherein said identifying of said specific person to be said specific registered user includes identifying a geographic location of an electronic device of said specific person.

11. The method of claim 1, wherein said identifying of said specific person to be said specific registered user includes zooming said imaging device on the face of said specific person.

12. The method of claim 1, wherein said identifying of said specific person to be said specific registered user includes obtaining one or more images from a second imaging device associated with the computerized system, said second imaging device differing from said imaging device in at least one characteristic selected from the group consisting of resolution and field of view.

13. The method of claim 1, wherein said multiple images are multiple frames of video.

14. The method of claim 1, wherein said displaying of said data that is customized to said specific registered user forms part of a login session, the method further comprising, during said login session of said specific registered user, disabling detection of additional login attempts to the computerized system.

15. The method of claim 1, wherein said displaying of said data that is customized to said specific registered user forms part of a login session, the method further comprising terminating said login session after a second pre-defined duration since initiating the login session.

16. The method of claim 1, wherein said displaying of said data that is customized to said specific registered user forms part of a login session, the method further comprising:
   G. identifying that said specific registered user is staring away from said screen for a third pre-determined time interval; and
   H. in response to said identifying that said specific registered user is staring away from said screen for said third pre-determined time interval, terminating said login session.

17. A device for logging into a computerized system having multiple registered users, the device being functionally associated with the computerized system, with a display, and with an imaging device, the device comprising:

a. a processor; and
b. a non-transitory computer readable storage medium for instructions execution by the processor, the non-transitory computer readable storage medium having stored:
   i. instructions, that when executed by said processor, receive multiple images of a vicinity of the display from the imaging device;
   ii. instructions, that when executed by said processor, detect a specific person appearing in at least some of said multiple images;
   iii. instructions, that when executed by said processor, detect, in said at least some of said multiple images, a direction of gaze in which said specific person is looking;
   iv. instructions, that when executed by said processor, identify, based only on (i) said detected direction of gaze being toward the display, and (ii) said detected direction of gaze being continuously kept by said specific person toward any location on the display for at least a pre-defined threshold duration, that said specific person is attempting to log into the computerized system by staring at the display;
   v. instructions, that when executed by said processor, identify said specific person to be a specific registered user of the multiple registered users of the computerized system;
   vi. instructions, that when executed by said processor, display on the display data that is customized to said specific registered user, said instructions that when executed by said processor display data that is customized to be executed subsequent to execution of said instructions that when executed by said processor identify that said specific person is attempting to log into the computerized system and subsequent to execution of said instructions that when executed by said processor identify said specific person to be said specific registered user of the computerized system,
      wherein said instructions that identify that said specific person is attempting to log into the computerized system and said instructions that display data that is customized to said specific registered user are both executed by said processor without receiving from said specific person any request to log into the computerized system other than by said staring at any location on the display, and without said specific person providing any additional login information or authentication information.

18. The device of claim 17, wherein execution of said instructions to display on said display data that is customized to said specific registered user forms part of a login session, said non-transitory computer readable storage medium further having stored instructions, that when executed by said processor, disable detection of additional login attempts to the computerized system during said login session of said specific registered user.

19. The device of claim 17, wherein execution of said instructions to display on said display data that is customized to said specific registered user forms part of a login session, said non-transitory computer readable storage medium further having stored instructions, that when executed by said processor, terminate said login session after a second pre-defined duration since initiating the login session.

20. The device of claim 17, wherein execution of said instructions to display on said display data that is customized to said specific registered user forms part of a login session, said non-transitory computer readable storage medium further having stored:
   G. instructions, that when executed by said processor, identify that said specific registered user is staring away from said screen for a third pre-determined time interval; and
   H. instructions, that when executed by said processor, terminate said login session in response to said identifying that said specific registered user is staring away from said screen for said third pre-determined time interval.

21. A computerized system enabling logging in for viewing customized data, the computerized system having multiple registered users, the computerized system comprising:
a. a display;
b. an imaging device, adapted to capture multiple images of a vicinity of said display; and
c. a controller including:
   i) a processor; and
   ii) a non-transitory computer readable storage medium for instructions execution by the processor, the non-transitory computer readable storage medium having stored:
      A) instructions, that when executed by said processor, receive multiple images from said imaging device;
      B) instructions, that when executed by said processor, detect a specific person appearing in at least some of said multiple images;
      C) instructions, that when executed by said processor, detect, in said at least some of said multiple images, a direction of gaze in which said specific person is looking;
      D) instructions, that when executed by said processor, identify, only based on (i) said detected direction of gaze being toward said display, and (ii) said detected direction of gaze being continuously kept by said specific person toward any location on said display for at least a pre-defined threshold duration, that said specific person is attempting to log into the computerized system by staring at said display;
      E) instructions, that when executed by said processor, identify said specific person to be a specific registered user of the multiple registered users of the computerized system;
      F) instructions, that when executed by said processor, display on said display data that is customized to said specific registered user, said instructions that when executed by said processor display data that is customized to be executed subsequent to execution of said instructions that when executed by said processor identify that said specific person is attempting to log into the computerized system and subsequent to execution of said instructions that when executed by said processor identify said specific person to be said specific registered user of the computerized system,
         wherein said instructions that identify that said specific person is attempting to log into the computerized system and said instructions that display data that is customized to said specific registered user are both executed by said processor without receiving from said specific person any request to log into the computerized system other than by said staring at any location on said display, and without said specific person providing any additional login information or authentication information.

22. The computerized system of claim 21, wherein execution of said instructions to display on said display data that is customized to said specific registered user forms part of a login session, said non-transitory computer readable storage medium further having stored instructions, that when executed by said processor, disable detection of additional login attempts to the computerized system during said login session of said specific registered user.

23. The computerized system of claim 21, wherein execution of said instructions to display on said display data that is customized to said specific registered user forms part of a login session, said non-transitory computer readable storage medium further having stored instructions, that when executed by said processor, terminate said login session after a second pre-defined duration since initiating the login session.

24. The computerized system of claim 21, wherein execution of said instructions to display on said display data that is customized to said specific registered user forms part of a login session, said non-transitory computer readable storage medium further having stored:

G. instructions, that when executed by said processor, identify that said specific registered user is staring away from said screen for a third pre-determined time interval; and H. instructions, that when executed by said processor, terminate said login session in response to said identifying that said specific registered user is staring away from said screen for said third pre-determined time interval.

* * * * *